United States Patent
Henzler et al.

(10) Patent No.: US 12,456,993 B2
(45) Date of Patent: Oct. 28, 2025

(54) WIRELESS CIRCUITRY WITH DELAY MEASUREMENT AND TUNING

(71) Applicant: Apple Inc., Cupertino, CA (US)

(72) Inventors: Stephan Henzler, Munich (DE); Nicholas Preyss, Oberhaching (DE); Jochen Schrattenecker, Alberndorf in der Riedmark (AT); Andreas Langer, Munich (DE); Alexander Klinkan, Linz (AT); Christoph Hepp, Munich (DE); Christoph Angerer, Sierning (AT)

(73) Assignee: Apple Inc., Cupertino, CA (US)

( * ) Notice: Subject to any disclaimer, the term of this patent is extended or adjusted under 35 U.S.C. 154(b) by 511 days.

(21) Appl. No.: 17/941,905

(22) Filed: Sep. 9, 2022

(65) Prior Publication Data

US 2024/0088924 A1     Mar. 14, 2024

(51) Int. Cl.
*H04B 1/04*     (2006.01)
*H04L 5/00*     (2006.01)
*H04W 56/00*     (2009.01)

(52) U.S. Cl.
CPC ......... *H04B 1/0458* (2013.01); *H04L 5/0048* (2013.01); *H04W 56/005* (2013.01); *H04B 2001/0408* (2013.01)

(58) Field of Classification Search
CPC .......... H04B 1/02; H04B 1/04; H04B 1/0458; H04B 1/0475; H04B 2001/0408; H04B 2001/0416; H04B 2001/0433; H04B 2001/045; H04W 56/003; H04W 56/005; H04W 56/0065; H04W 56/009; H04L 5/0048
See application file for complete search history.

(56) References Cited

U.S. PATENT DOCUMENTS

| | | | |
|---|---|---|---|
| 6,388,513 B1 | 5/2002 | Wright et al. | |
| 7,474,149 B2 | 1/2009 | Snelgrove et al. | |
| 7,626,519 B2 | 12/2009 | Risbo | |
| 7,715,811 B2 * | 5/2010 | Kenington | H04B 1/0475 455/127.1 |
| 7,800,437 B2 | 9/2010 | Khoury et al. | |
| 8,081,946 B2 | 12/2011 | Fudge | |
| 8,718,579 B2 * | 5/2014 | Drogi | H04B 1/0475 455/127.1 |

(Continued)

*Primary Examiner* — Quochien B Vuong
(74) *Attorney, Agent, or Firm* — Treyz Law Group; Jason Tsai

(57) ABSTRACT

Wireless circuitry can include a processor that generates a baseband signal, an upconversion circuit that upconverts the baseband signals to a radio-frequency signal, and an amplifier that amplifies the radio-frequency signal. A tunable delay circuit can be used to selectively delay generation of the radio-frequency signal or to delay generation of another signal intended for the radio-frequency amplifier. The tunable delay circuit can be controlled using a closed-loop delay adaptation scheme. A feedback receiver that is coupled to an output of the amplifier can be used to generate a demodulated signal. A delay error measurement circuit can be used to receive the demodulated signal, to detect a peak by monitoring when an envelope of the demodulated signal crosses a threshold level, to compute an amount of asymmetry in the detected peak, and to output a signal that is used to control the tunable delay circuit.

20 Claims, 9 Drawing Sheets

(56) References Cited

U.S. PATENT DOCUMENTS

| | | |
|---|---|---|
| 8,908,797 B2 | 12/2014 | Jeckeln |
| 8,942,313 B2 | 1/2015 | Khlat et al. |
| 9,264,005 B1 * | 2/2016 | Cho ............... H03F 1/0222 |
| 9,450,553 B2 * | 9/2016 | Langer ............ H04B 1/0458 |
| 9,692,366 B2 * | 6/2017 | Pilgram ............. H03F 3/24 |
| 10,716,080 B2 | 7/2020 | Wolberg et al. |
| 2009/0097591 A1 | 4/2009 | Kim |

* cited by examiner

WIRELESS CIRCUITRY WITH DELAY MEASUREMENT AND TUNING

FIELD

This disclosure relates generally to electronic devices and, more particularly, to electronic devices with wireless communications circuitry.

BACKGROUND

Electronic devices can be provided with wireless communications capabilities. An electronic device with wireless communications capabilities has wireless communications circuitry with one or more antennas. Wireless transceiver circuitry in the wireless communications circuitry uses the antennas to transmit and receive radio-frequency signals.

Radio-frequency signals transmitted by an antenna can be fed through one or more power amplifiers, which are configured to amplify low power analog signals to higher power signals more suitable for transmission through the air over long distances. A radio-frequency power amplifier can receive a radio-frequency signal and an adjustable supply voltage. It can be challenging to have the adjustable supply voltage track the radio-frequency signal to avoid signal distortion.

SUMMARY

An electronic device may include wireless communications circuitry. The wireless communications circuitry can include one or more processors or signal processing blocks for generating baseband signals, a transceiver for receiving the digital signals and for generating corresponding radio-frequency signals, and one or more radio-frequency power amplifiers configured to amplify the radio-frequency signals for transmission by one or more antennas in the electronic device. A radio-frequency amplifier can receive a radio-frequency signal and a control signal. If care is not taken, the timing of the radio-frequency frequency signal and the control signal might not be properly aligned.

An aspect of the disclosure provides wireless circuitry that includes: a radio-frequency amplifier having a first input configured to receive a radio-frequency signal, a second input, and an output; a tunable delay circuit configured to receive a baseband signal and configured to selectively delay the baseband signal when generating the radio-frequency signal for the first input of the radio-frequency amplifier or to selectively delay the baseband signal when generating a signal for the second input of the radio-frequency amplifier; a feedback receiver coupled to the output of the radio-frequency amplifier and configured to generate a corresponding baseband signal; and a delay error measurement circuit configured to receive the corresponding baseband signal generated by the feedback receiver and to output an error signal that is used to control the tunable delay circuit. The wireless circuitry can further include envelope tracking circuitry configured to output a variable power supply voltage to the second input (or power supply terminal) of the radio-frequency amplifier. The wireless circuitry can further include a control signal generator configured to output the signal for the second input of the radio-frequency amplifier, the signal being used to tune an adjustable load component in the radio-frequency amplifier.

The delay error measurement circuit can be configured to detect one or more peaks in an envelope of the baseband signal by detecting when the envelope of the baseband signal rises above a threshold level and to output the error signal by computing an amount of asymmetry in the one or more detected peaks, by averaging measurements from a plurality of detected peaks, and/or to compute rise and fall times in the one or more detect peaks using interpolation. The wireless circuitry can further include a delay controller configured to receive the error signal and to output a delay control signal for adjusting the tunable delay circuit. The delay error measurement circuit can include a threshold detector configured to detect when an envelope of the baseband signal exceeds a threshold level; a peak detector configured to detect a peak point in the envelope of the baseband signal; a rising edge measurement circuit configured to output a first value proportional to a rise time of a rising edge in the envelope of the baseband signal by performing a first interpolation operation, the rise time extending from when the envelope exceeds the threshold level until the peak point; a falling edge measurement circuit configured to output a second value proportional to a fall time of a falling edge in the envelope of the baseband signal by performing a second interpolation operation, the fall time extending form when the envelope reaches the peak point until falling below the threshold level; a subtractor configured to compute a difference between the first and second values; a normalization block configured to scale the difference by a duration of the one or more detected peaks; and a low pass filter configured to average the difference.

An aspect of the disclosure provides a method of operating wireless circuitry that includes using a radio-frequency amplifier to amplify a radio-frequency signal, using a feedback receiver to receive a portion of the amplified radio-frequency signal and to output a demodulated (baseband) signal, detecting one or more peaks in an envelope of the demodulated signal, computing an amount of asymmetry in the one or more detected peaks, and selectively delaying an input signal to the radio-frequency amplifier based on the computed amount of asymmetry. The method can further include delaying the radio-frequency signal in response to determining that the one or more detected peaks are skewed in a first direction and delaying a power supply voltage or a load impedance control signal for the radio-frequency amplifier in response to determining that the one or more detected peaks are skewed in a second direction different than the first direction. The method can further include averaging timing measurements obtained from multiple detected peaks, and performing interpolation to detect when the one or more peaks in the envelope crosses a threshold value.

An aspect of the disclosure provides circuitry that includes a radio-frequency amplifier, a tunable delay circuit coupled to one or more inputs of the radio-frequency amplifier, a measurement receiver coupled to an output of the radio-frequency amplifier and configured to generate a demodulated signal, and a symmetry detection circuit configured to receive the demodulated signal, detect a peak by monitoring when an envelope of the demodulated signal crosses a threshold level, compute an amount of asymmetry in the detected peak, and output a signal that is used to control the tunable delay circuit.

DETAILED DESCRIPTION

Figure 1:
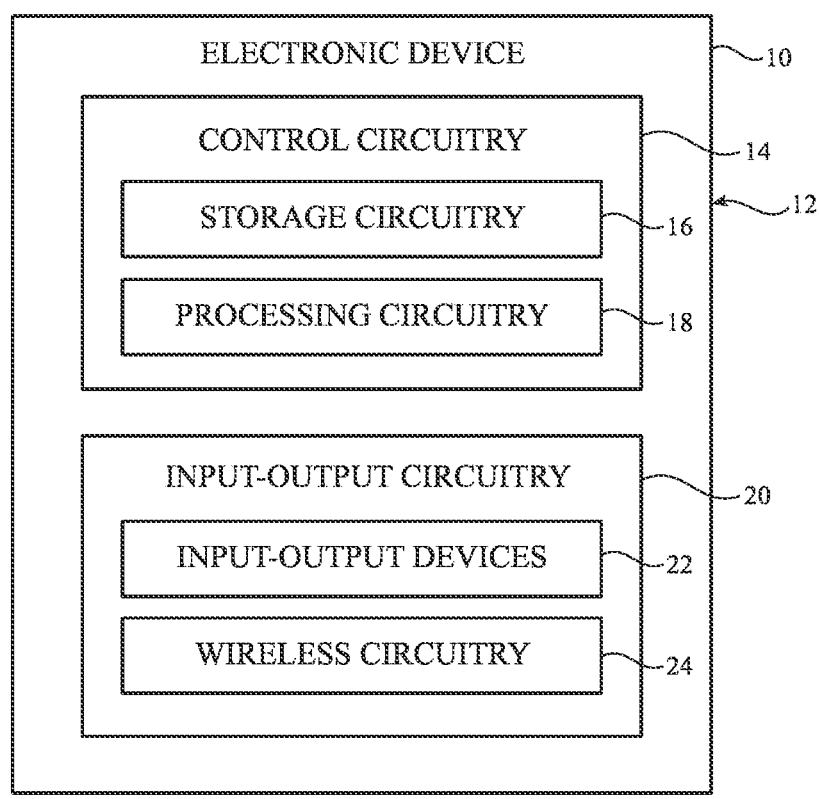
FIG. 1 is a diagram of an illustrative electronic device having wireless circuitry in accordance with some embodiments.

An electronic device such as device 10 of FIG. 1 may be provided with wireless circuitry. The wireless circuitry may include a processor for generating baseband signals, an upconversion circuit for upconverting (mixing) the baseband signals into radio-frequency signals, a radio-frequency amplifier for amplifying the radio-frequency signals, and an antenna for radiating the amplified radio-frequency signals.

In additional to the primary input that receives the radio-frequency signals, the radio-frequency (RF) amplifier can have another input configured to receive an adjustable power supply voltage, an adjustable bias voltage, a control signal for tuning an adjustable impedance associated with the RF amplifier, or other control signal. There may be a delay between the radio-frequency input signal and the adjustable supply/control signal at the additional input. To mitigate this delay, the wireless circuitry may include a tunable delay circuit for selectively delaying the radio-frequency signal or the supply/control signal. The tunable delay circuit may be controlled using circuitry that monitors only an amplified signal generated at the output of the radio-frequency amplifier.

The wireless circuitry can include a feedback receiver that receives a portion of the amplified signal coupled from the output of the radio-frequency amplifier and that generates a demodulated (baseband) signal, a delay error measurement circuit, and a delay control circuit. The delay error measurement circuit may be configured to receive the demodulated signal, to detect one or more peaks in the envelope of the demodulated signal, and to monitor an amount of asymmetry in the detected peaks. The delay error measurement circuit may output an error signal that is proportional to the measured amount of asymmetry. The delay control circuit may adjust the tunable delay circuit based on the value of the error signal. A closed loop delay adaption of such type can provide the technical advantage or benefit of automatically tuning the delay in the transmit path during normal operation to optimize gain and minimize signal distortion for the radio-frequency power amplifier.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed from plastic, glass, ceramics, fiber composites, metal (e.g., stainless steel, aluminum, metal alloys, etc.), other suitable materials, or a combination of these materials. In some embodiments, parts or all of housing 12 may be formed from dielectric or other low-conductivity material (e.g., glass, ceramic, plastic, sapphire, etc.). In other embodiments, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas. Wireless circuitry 24 may also include baseband processor circuitry, transceiver circuitry, amplifier circuitry, filter circuitry, switching circuitry, radio-frequency transmission lines, and/or any other circuitry for transmitting and/or receiving radio-frequency signals using the antenna(s).

Wireless circuitry 24 may transmit and/or receive radio-frequency signals within a corresponding frequency band at radio frequencies (sometimes referred to herein as a communications band or simply as a "band"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Figure 2:
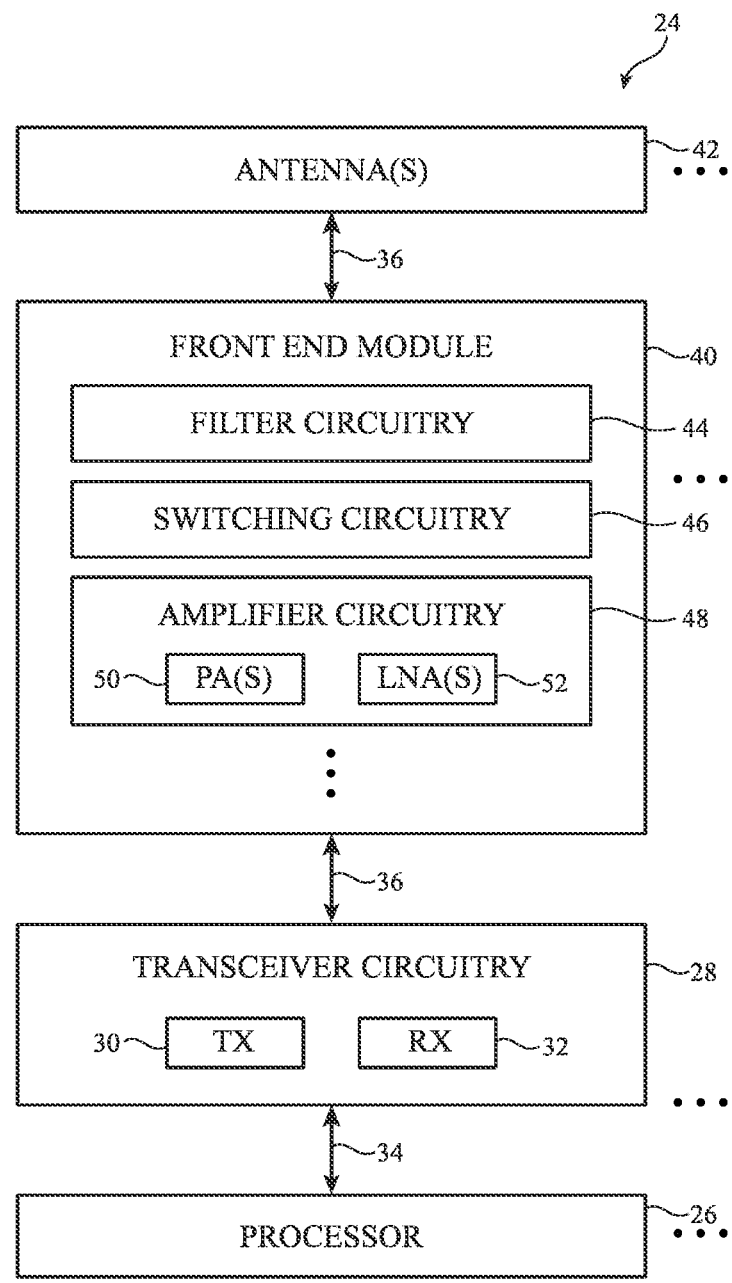
FIG. 2 is a diagram of illustrative wireless circuitry having amplifiers in accordance with some embodiments.

FIG. 2 is a diagram showing illustrative components within wireless circuitry 24. As shown in FIG. 2, wireless circuitry 24 may include a processor such as processor 26, radio-frequency (RF) transceiver circuitry such as radio-frequency transceiver 28, radio-frequency front end circuitry such as radio-frequency front end module (FEM) 40, and antenna(s) 42. Processor 26 may be a baseband processor, application processor, general purpose processor, microprocessor, microcontroller, digital signal processor, host processor, application specific signal processing hardware, or other type of processor. Processor 26 may be coupled to transceiver 28 over path 34. Transceiver 28 may be coupled to antenna 42 via radio-frequency transmission line path 36. Radio-frequency front end module 40 may be disposed on radio-frequency transmission line path 36 between transceiver 28 and antenna 42.

In the example of FIG. 2, wireless circuitry 24 is illustrated as including only a single processor 26, a single transceiver 28, a single front end module 40, and a single antenna 42 for the sake of clarity. In general, wireless circuitry 24 may include any desired number of processors 26, any desired number of transceivers 28, any desired number of front end modules 40, and any desired number of antennas 42. Each processor 26 may be coupled to one or more transceiver 28 over respective paths 34. Each transceiver 28 may include a transmitter circuit 30 configured to output uplink signals to antenna 42, may include a receiver circuit 32 configured to receive downlink signals from antenna 42, and may be coupled to one or more antennas 42 over respective radio-frequency transmission line paths 36. Each radio-frequency transmission line path 36 may have a respective front end module 40 disposed thereon. If desired, two or more front end modules 40 may be disposed on the same radio-frequency transmission line path 36. If desired, one or more of the radio-frequency transmission line paths 36 in wireless circuitry 24 may be implemented without any front end module disposed thereon.

Radio-frequency transmission line path 36 may be coupled to an antenna feed on antenna 42. The antenna feed may, for example, include a positive antenna feed terminal and a ground antenna feed terminal. Radio-frequency transmission line path 36 may have a positive transmission line signal path such that is coupled to the positive antenna feed terminal on antenna 42. Radio-frequency transmission line path 36 may have a ground transmission line signal path that is coupled to the ground antenna feed terminal on antenna 42. This example is illustrative and, in general, antennas 42 may be fed using any desired antenna feeding scheme. If desired, antenna 42 may have multiple antenna feeds that are coupled to one or more radio-frequency transmission line paths 36.

Radio-frequency transmission line path 36 may include transmission lines that are used to route radio-frequency antenna signals within device 10 (FIG. 1). Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc.

Transmission lines in device 10 such as transmission lines in radio-frequency transmission line path 36 may be integrated into rigid and/or flexible printed circuit boards.

In performing wireless transmission, processor 26 may provide transmit signals (e.g., digital or baseband signals) to transceiver 28 over path 34. Transceiver 28 may further include circuitry for converting the transmit (baseband) signals received from processor 26 into corresponding radio-frequency signals. For example, transceiver circuitry 28 may include mixer circuitry for up-converting (or modulating) the transmit (baseband) signals to radio frequencies prior to transmission over antenna 42. The example of FIG. 2 in which processor 26 communicates with transceiver 28 is illustrative. In general, transceiver 28 may communicate with a baseband processor, an application processor, general purpose processor, a microcontroller, a microprocessor, or one or more processors within circuitry 18. Transceiver circuitry 28 may also include digital-to-analog converter (DAC) and/or analog-to-digital converter (ADC) circuitry for converting signals between digital and analog domains. Transceiver 28 may use transmitter (TX) 30 to transmit the radio-frequency signals over antenna 42 via radio-frequency transmission line path 36 and front end module 40. Antenna 42 may transmit the radio-frequency signals to external wireless equipment by radiating the radio-frequency signals into free space.

Front end module (FEM) 40 may include radio-frequency front end circuitry that operates on the radio-frequency signals conveyed (transmitted and/or received) over radio-frequency transmission line path 36. FEM 40 may, for example, include front end module (FEM) components such as radio-frequency filter circuitry 44 (e.g., low pass filters, high pass filters, notch filters, band pass filters, multiplexing circuitry, duplexer circuitry, diplexer circuitry, triplexer circuitry, etc.), switching circuitry 46 (e.g., one or more radio-frequency switches), radio-frequency amplifier circuitry 48 (e.g., one or more power amplifier circuits 50 and/or one or more low-noise amplifier circuits 52), impedance matching circuitry (e.g., circuitry that helps to match the impedance of antenna 42 to the impedance of radio-frequency transmission line 36), antenna tuning circuitry (e.g., networks of capacitors, resistors, inductors, and/or switches that adjust the frequency response of antenna 42), radio-frequency coupler circuitry, charge pump circuitry, power management circuitry, digital control and interface circuitry, and/or any other circuitry that operates on the radio-frequency signals transmitted and/or received by antenna 42. Each of the front end module components may be mounted to a common (shared) substrate such as a rigid printed circuit board substrate or flexible printed circuit substrate. If desired, the various front end module components may also be integrated into a single integrated circuit chip. If desired, amplifier circuitry 48 and/or other components in front end 40 such as filter circuitry 44 may also be implemented as part of transceiver circuitry 28.

Filter circuitry 44, switching circuitry 46, amplifier circuitry 48, and other circuitry may be disposed along radio-frequency transmission line path 36, may be incorporated into FEM 40, and/or may be incorporated into antenna 42 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antenna 42 over time.

Transceiver 28 may be separate from front end module 40. For example, transceiver 28 may be formed on another substrate such as the main logic board of device 10, a rigid printed circuit board, or flexible printed circuit that is not a part of front end module 40. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, processor 26 and/or portions of transceiver 28 (e.g., a host processor on transceiver 28) may form a part of control circuitry 14. Control circuitry 14 (e.g., portions of control circuitry 14 formed on processor 26, portions of control circuitry 14 formed on transceiver 28, and/or portions of control circuitry 14 that are separate from wireless circuitry 24) may provide control signals (e.g., over one or more control paths in device 10) that control the operation of front end module 40.

Transceiver circuitry 28 may include wireless local area network transceiver circuitry that handles WLAN communications bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network transceiver circuitry that handles the 2.4 GHz Bluetooth® band or other WPAN communications bands, cellular telephone transceiver circuitry that handles cellular telephone bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), near-field communications (NFC) transceiver circuitry that handles near-field communications bands (e.g., at 13.56 MHz), satellite navigation receiver circuitry that handles satellite navigation bands (e.g., a GPS band from 1565 to 1610 MHz, a Global Navigation Satellite System (GLONASS) band, a BeiDou Navigation Satellite System (BDS) band, etc.), ultra-wideband (UWB) transceiver circuitry that handles communications using the IEEE 802.15.4 protocol and/or other ultra-wideband communications protocols, and/or any other desired radio-frequency transceiver circuitry for covering any other desired communications bands of interest.

Wireless circuitry 24 may include one or more antennas such as antenna 42. Antenna 42 may be formed using any desired antenna structures. For example, antenna 42 may be an antenna with a resonating element that is formed from loop antenna structures, patch antenna structures, inverted-F antenna structures, slot antenna structures, planar inverted-F antenna structures, helical antenna structures, monopole antennas, dipoles, hybrids of these designs, etc. Two or more antennas 42 may be arranged into one or more phased antenna arrays (e.g., for conveying radio-frequency signals at millimeter wave frequencies). Parasitic elements may be included in antenna 42 to adjust antenna performance. Antenna 42 may be provided with a conductive cavity that backs the antenna resonating element of antenna 42 (e.g., antenna 42 may be a cavity-backed antenna such as a cavity-backed slot antenna).

As described above, front end module 40 may include one or more power amplifiers (PA) circuits 50 in the transmit (uplink) path. A power amplifier 50 (sometimes referred to as radio-frequency power amplifier, transmit amplifier, or amplifier) may be configured to amplify a radio-frequency signal without changing the signal shape, format, or modulation. Amplifier 50 may, for example, be used to provide 10 dB of gain, 20 dB of gain, 10-20 dB of gain, less than 20 dB of gain, more than 20 dB of gain, or other suitable amounts of gain.

It can be challenging to design a satisfactory radio-frequency power amplifier for an electronic device. In general, a radio-frequency amplifier is most efficient when it is operating in compression (i.e., when an increase in the input power results in a non-linear change in the output power of the amplifier, which typically occurs at the higher range of input power levels). Conventional radio-frequency power amplifiers that receive a fixed power supply voltage will become less efficient when the amplifier operates at lower input power levels.

In an effort to address this reduction in efficiency, an envelope tracking technique has been developed where the power supply voltage of the radio-frequency power amplifier is continuously adjusted such that the gain of the power amplifier remains constant over varying signal amplitudes (sometimes referred to as iso-gain operation). Other gain shaping strategies such as iso-compression operation, pre-defined gain-over-power characteristic, etc. are possible as well. As an example, an envelope tracking system can generate a variable power supply voltage using a static linear transformation of the absolute value of a baseband signal from which the radio-frequency signals are generated. Ideally, the variably power supply perfectly tracks the envelope of the radio-frequency signal over time. In practice, however, there may be some delay between the radio-frequency signal and the variably power supply voltage arriving at the inputs of the radio-frequency power amplifier. If care is not taken, such delay between the input signals can lead to unwanted gain values and signal distortion.

A static delay setting can be obtained using factory calibration operations, but such fixed delay setting acquired via calibration can only address process variations arising from imperfections in the semiconductor manufacturing process. For applications with higher bandwidth operation (e.g., when the bandwidth of the baseband signal is greater than 100 MHz, greater than 50 MHz, 50-100 MHz, 100-200 MHz, greater than 150 MHz, greater than 200 MHz, greater than 300 MHz, etc.), other sources of variation such as temperature and voltage variations can cause the delay between the amplifier input signals to deviate by an amount that is not taken into account by the calibrated delay setting.

Figure 3:
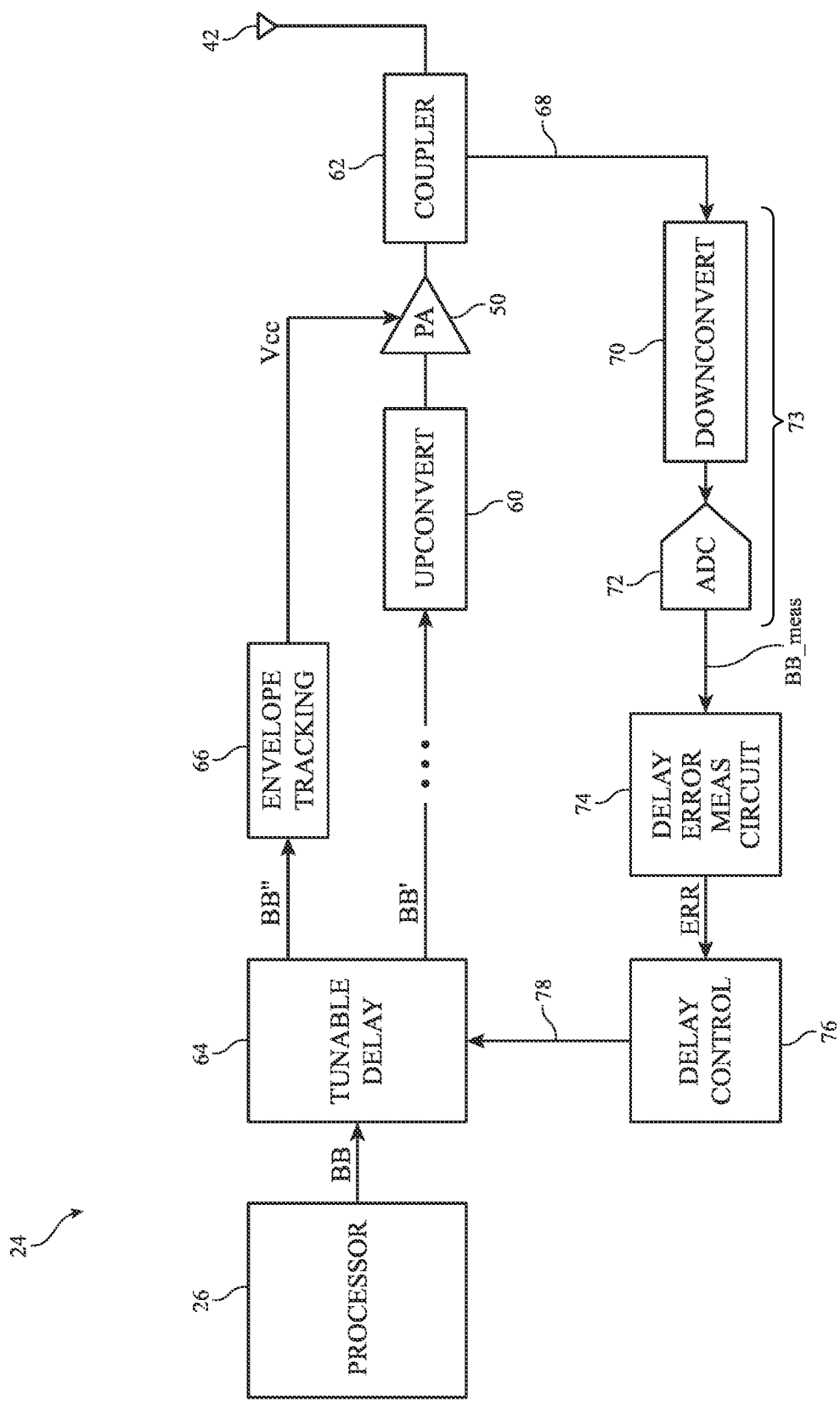
FIG. 3 is a diagram of illustrative transmit circuitry having tunable delay circuitry configured to delay a baseband signal in accordance with some embodiments.

FIG. 3 is a diagram of illustrative wireless circuitry 24 having circuitry for adaptively or dynamically mitigating the delay between the input signals for a radio-frequency amplifier 50 in real time. As shown in FIG. 3, wireless circuitry 24 may include processor 26, a tunable delay circuit such as tunable delay circuit 64, an upconversion circuit such as upconverter 60, a radio-frequency power amplifier such as amplifier 50, and an antenna 42 configured to radiate radio-frequency signals output from amplifier 50. Processor 26 may represent one or more processors such as a baseband processor, an application processor, a digital signal processor, a microcontroller, a microprocessor, a central processing unit (CPU), a programmable device, a combination of these circuits, and/or one or more processors within circuitry 18. Processor 26 may be configured to generate a baseband signal BB. Signal BB is sometimes referred to as a digital signal or a transmit signal. As examples, signal BB generated by processor 26 may include in-phase (I) and quadrature-phase (Q) signals, radius and phase signals, a vector input, or other digitally coded signals.

Tunable delay circuit 64 may be configured to receive signal BB and to output a first baseband signal BB' to upconverter 60 and a second baseband signal BB" to envelope tracking circuitry 66. In some scenarios, tunable delay circuit 64 can generate signal BB' by delaying signal BB (while signal BB is passed through without delay as signal BB"). In other scenarios, tunable delay circuit 64 can generate signal BB" by delaying signal BB (while signal BB is passed through without delay as signal BB'). In other words, only one of signals BB' and BB" should be delayed by circuit 64 at any given time relative to input baseband signal BB. Tunable delay circuit 64 may include one or more stages of delay or buffer circuits.

Baseband signal BB' may at some point be converted from the digital domain into the analog domain using one or more digital-to-analog converters and then upconverted (modulated) to radio frequencies, using upconverter 60 (e.g., a radio-frequency mixer), from the baseband frequency range (which is typically in the range of a couple hundred to a couple hundred MHz) to radio frequencies in the range of hundreds of MHz or in the GHz range. Upconverter 60 is sometimes referred to as a radio-frequency modulator. The upconverted radio-frequency signal may be fed as an input to amplifier 50. Amplifier 50 may generate corresponding amplified radio-frequency signals that can then be radiated by antenna(s) 42.

Wireless circuitry 24 may include an envelope tracking (ET) system such as envelope tracking circuitry 66 configured to receive baseband signal BB" and to continuously adjust a supply voltage of amplifier 50 to ensure that amplifier 50 is always operating at peak efficiency. Envelope tracking circuitry 66 may be configured to generate a variable power supply voltage Vcc using a static linear transformation of the absolute value of baseband signal BB", using a non-linearity estimator (e.g., an amplifier non-linearity estimator that models a non-linear behavior of amplifier 50), using an amplifier load response estimator (e.g., an amplifier load response estimator that implements a baseband model of a frequency-dependent response of a load at the output of amplifier 50), and/or using other circuitry that can tune the amplifier power supply voltage Vcc. Power supply voltage Vcc is fed to a power supply terminal of amplifier 50. The power supply terminal of amplifier 50 that receives Vcc from envelope tracking circuitry 66 is sometimes referred to as a control input of amplifier 50. Tunable power supply voltage Vcc can therefore sometimes be referred to and defined herein as a control signal. Thus, envelope tracking circuitry 66 can sometimes be referred to generally as a control signal generator.

Ideally, envelope tracking circuitry 66 tunes supply voltage Vcc by perfectly tracking the envelope of the radio-frequency signal arriving at amplifier 60. In practice, however, there may be some amount of delay between the radio-frequency input signal and the tracking Vcc signal, which can result in unpredictable gain values and unwanted signal distortion. In accordance with some embodiments, wireless circuitry 24 can include circuits that only monitor the signal at the output of amplifier 50 to determine whether the variable supply voltage Vcc is leading or trailing the envelope of radio-frequency input signal. In particular, wireless circuitry 24 may include circuits that determine whether Vcc is leading or trailing the envelope of the radio-frequency signal by monitoring the asymmetry in one or more peaks of the envelope of the amplified signal at the output of amplifier 50. This technique of only monitoring the asymmetry of the envelope of the signal from the output of amplifier 50 obviates the need to individually access and compare the radio-frequency signal at the input of amplifier 50 and the variable amplifier power supply voltage Vcc at the control input of amplifier 50.

To monitor or measure the amplified signal at the output of amplifier 50 (sometimes referred to as the amplifier output signal), wireless circuitry 24 may include a down-conversion circuit such as downconverter 70 configured to receive the radio-frequency signals from coupler 62 via a feedback path 68 and to demodulate the radio-frequency signals from radio frequencies down to baseband frequencies. Radio-frequency coupler 62 may be configured to couple a portion of the amplified radio-frequency signals output from amplifier circuit 50 onto feedback (measurement) path 68. Downconverter 70 is sometimes referred to as a radio-frequency demodulator or mixer. Downconverter 70 may be coupled to an analog-to-digital converter (ADC) 72 configured to convert the demodulated signals from the analog domain to the digital domain. The demodulated digital signal generated at the output of ADC 72 is sometimes referred to as a measured signal BB_meas or a measured (feedback) digital baseband signal. Downconverter 70 and data converter 72 are sometimes referred to collectively as a feedback or measurement receiver 73. Demodulated signal BB_meas may represent a downconverted version of the amplifier output signal.

Wireless circuitry 24 may further include a delay error measurement circuit such as delay error measurement circuit 74 configured to receive demodulated signal BB_meas and to output a corresponding error signal ERR having a value that depends on an amount of asymmetry that is detected in one or more peaks in the envelope of signal BB_meas (e.g., the value of error signal ERR may depend on the peak asymmetry in the envelope of the demodulated signal BB_meas). For example, signal ERR may be set equal to zero if circuit 74 determines that one or more peaks in the envelope of signal BB_meas is symmetrical. When the one or more peaks in the envelope of signal BB_meas is asymmetrical, signal ERR may be set equal to a positive value if circuit 74 determines that the rise time of a peak is shorter than the fall time of that peak or may be set equal to a negative value if circuit 74 determines that the rise time of a peak is longer than the fall time of that peak or vice versa. Delay error measurement circuit 74 can therefore indirectly estimate an amount of delay misalignment between the radio-frequency signal and supply voltage Vcc at the inputs of amplifier 50 by detecting an amount of peak asymmetry in the envelope of the demodulated digital signal BB_meas. Delay error measurement circuit 74 can therefore sometimes be referred to as a symmetry detection circuit or a peak symmetry detection circuit.

Wireless circuitry 24 may also include a delay control circuit such as delay control circuit 76. Delay control circuit 76 may receive error signal ERR from delay error measurement circuit 74 and may output a delay control signal to adjust tunable delay circuit 64 via path 78. Depending on the value of signal ERR, delay control circuit 76 can direct tunable delay circuit 64 to delay signal BB" relative to signal BB' (e.g., upon detecting that Vcc might be leading the envelope of the RF input signal based on the type of peak asymmetry in the envelope of BB_meas), to delay signal BB' relative to signal BB" (e.g., upon detecting that Vcc might be trailing the envelope of the RF input signal based on the type of peak asymmetry in the envelope of BB_meas), or to not introduce any delay in the two paths (e.g., upon detecting that Vcc is properly tracking the envelope of the RF input signal based on detecting one or more symmetrical peaks in the envelope of BB_meas).

For instance, a peak signal profile that leans to the left (i.e., a valid pulse having a rise time that is shorter than the fall time) might indicate that voltage Vcc in the control path is arriving at the amplifier earlier than the radio-frequency input signal. In such scenario, tunable delay circuit 64 can delay the generation of Vcc (e.g., by delaying the generation of baseband signal BB"). On the other hand, a peak signal profile that leans to the right (i.e., a valid pulse having a fall time that is shorter than the rise time) might indicate that voltage Vcc in the control path is arriving at the amplifier later than the radio-frequency input signal. In such scenario, tunable delay circuit 64 can delay the generation of the radio-frequency input signal (e.g., by delaying the generation of baseband signal BB'). The delay control scheme shown in the example of FIG. 3 can be referred to as a "closed loop" delay adaptation.

Figure 4:
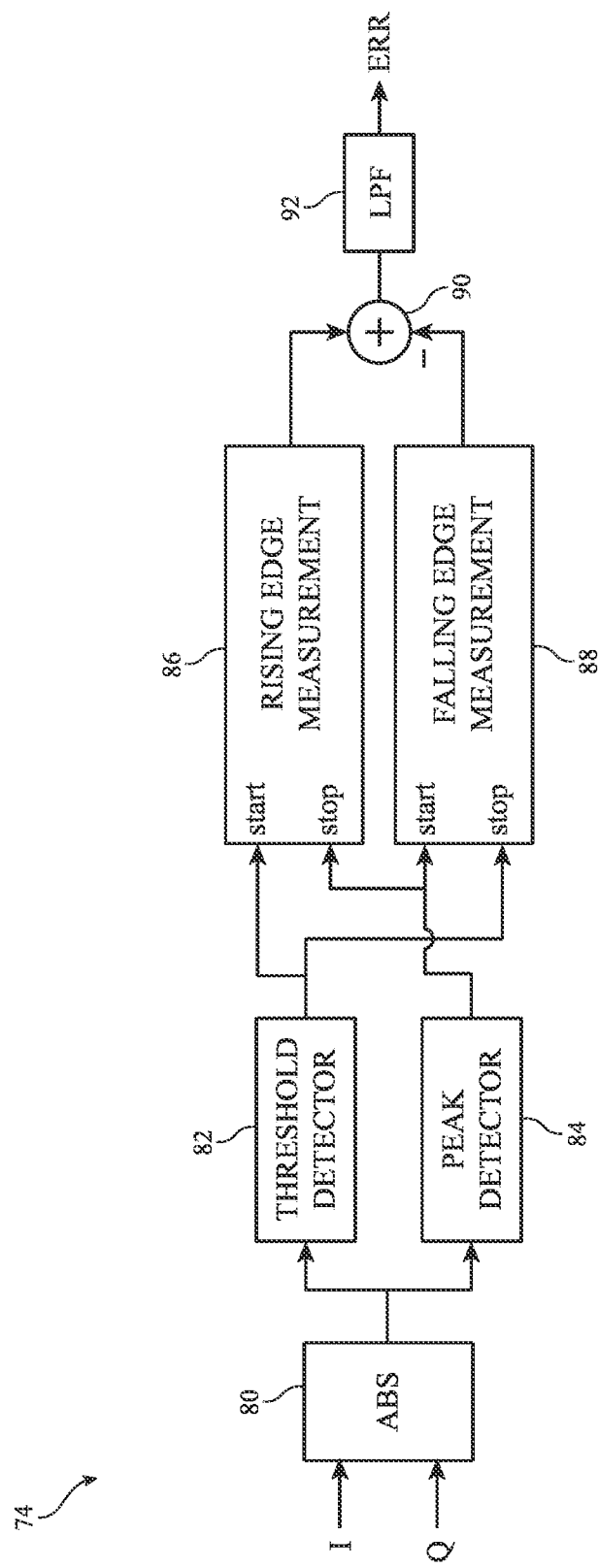
FIG. 4 is a diagram of an illustrative delay error measurement circuit in accordance with some embodiments.

FIG. 4 is a diagram illustrating one embodiment of delay error measurement circuit 74. As shown in FIG. 4, delay error measurement circuit 74 can include an absolute function generator such as absolute (ABS) function circuit 80, a threshold detection circuit such as threshold detector 82, a peak detection circuit such as peak detector 84, a rising edge measurement circuit such as rising edge measurement circuit 86, a falling edge measurement circuit such as falling edge measurement circuit 88, a signal combiner such as summing circuit 90, and optionally a filtering circuit such as low pass filter (LPF) 92. Absolute function generator 80 may, as an example, receive demodulated baseband signal BB_meas in the form of in-phase (I) and quadrature (Q) signals. Absolute function generator 80 may apply the absolute value function on its input signals to generate a corresponding absolute value output signal, which can represent an envelope of its input signals. This resulting envelope signal can be sampled in discrete time intervals using circuits 80, 82, and/or 84.

Figure 5:
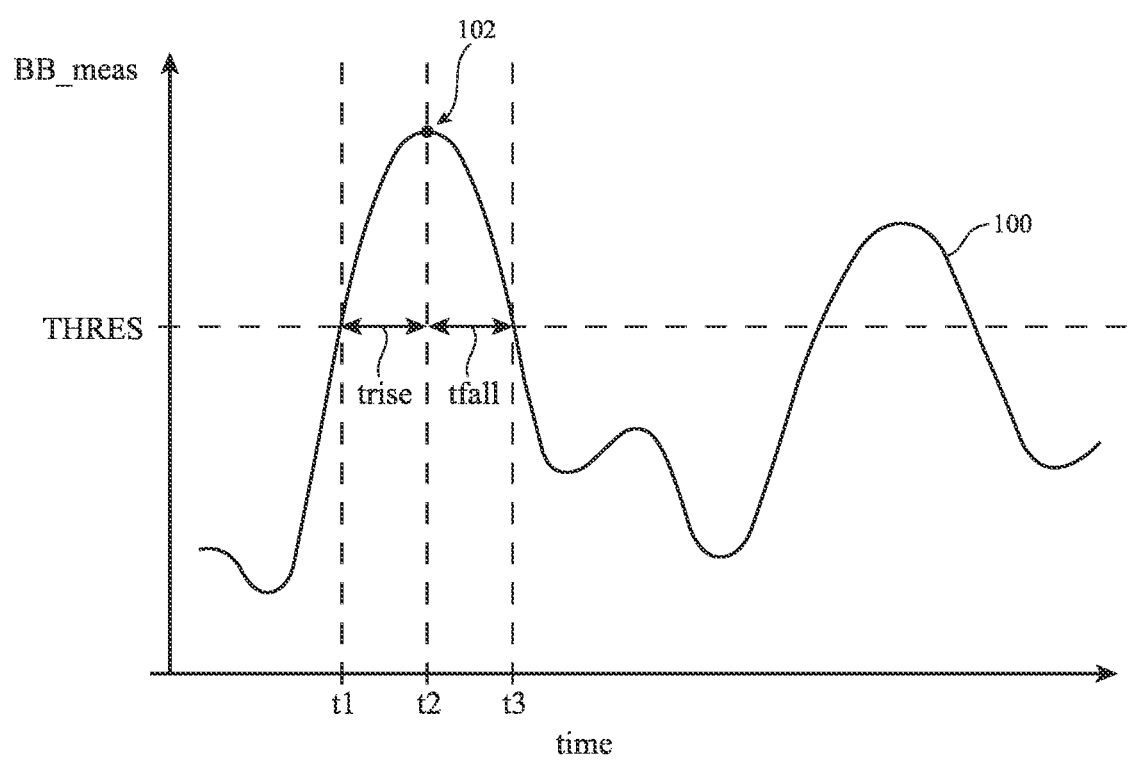
FIG. 5 is a timing diagram illustrating how asymmetry of a peak in an envelope signal can be detected in accordance with some embodiments.
Figure 6A:
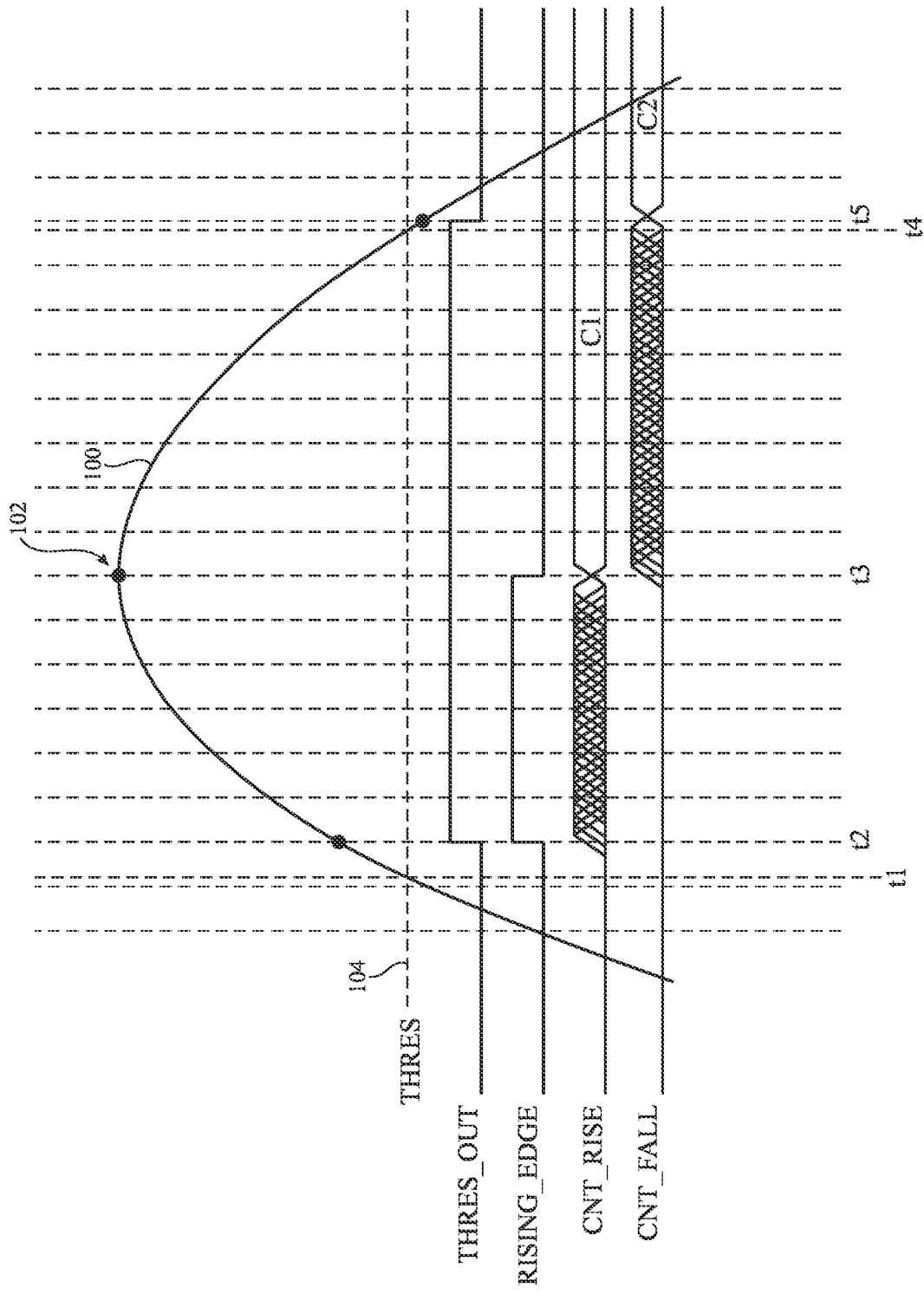
FIG. 6A is a timing diagram illustrating how rise and fall times of a signal peak exceeding a threshold level can be quantified in accordance with some embodiments.
Figure 6B:
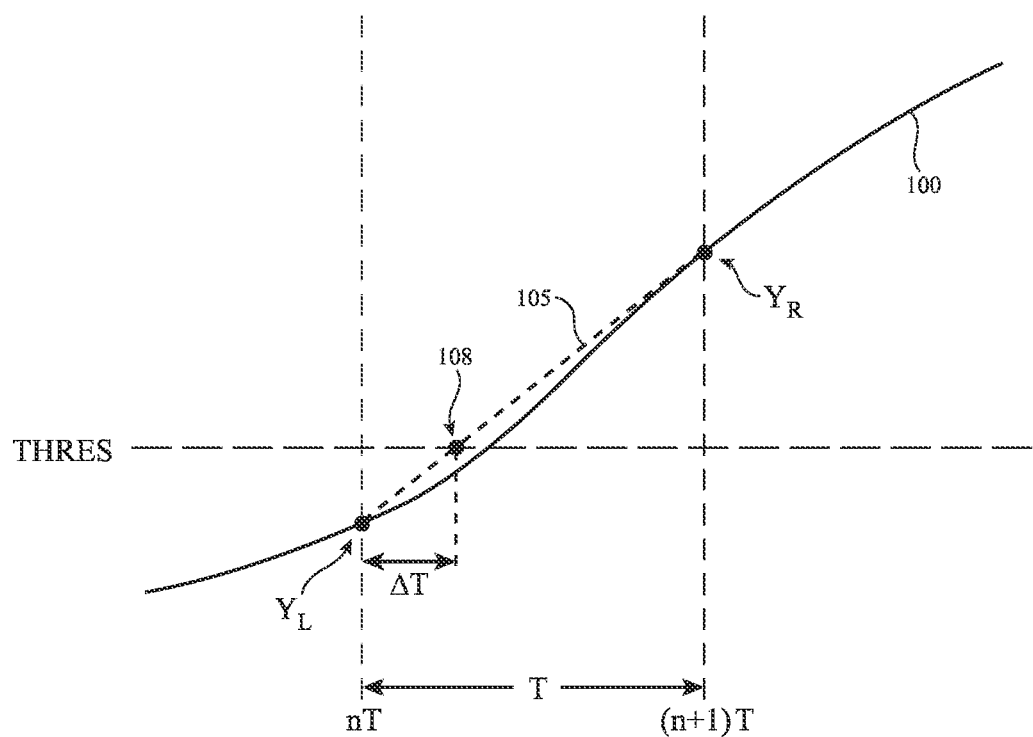
FIG. 6B is a timing diagram illustrating how a threshold crossing point can be interpolated in accordance with some embodiments.

The function and operation of the remaining components within delay measurement circuit 74 are best understood in conjunction with the timing diagrams of FIGS. 5, 6A, and 6B. FIG. 5 plots an exemplary demodulated baseband signal BB_meas as a function of time. Curve (waveform) 100 may represent the envelope of the demodulated baseband signal BB_meas. Threshold detector 82 (FIG. 4) may receive envelope waveform 100 from the output of circuit 80 and may be configured to detect when envelope waveform 100 exceeds a given threshold level THRES. Threshold detector 82 may output a high value (e.g., a logic "1") when waveform 100 exceeds the threshold level and may output a low value (e.g., a logic "0") when waveform 100 is below the threshold level. In the example of FIG. 5, threshold detector 82 may assert its output (e.g., drive its output high) at time t1 when waveform 100 rises above THRES and may deassert its output (e.g., drive its output low) at time t3 when waveform 100 falls below THRES.

Threshold level THRES can be a predetermined value and can be statically set or can be adjusted. The value of threshold level THRES should be selected to only detect valid peaks in the envelope waveform. For example, threshold level THRES can be set to half of the peak-to-peak voltage range. If desired, the threshold level can be set to greater than half the peak-to-peak voltage, 60% of the peak-to-peak voltage range, 70% of the peak-to-peak voltage range, 50-80% of the peak-to-peak voltage range, or other suitable value for detecting actual peaks in the envelope signal.

Peak detector 84 may receive envelope waveform 100 from the output of circuit 80 and may be configured to detect a peak in envelope waveform 100. Peak detector 84 may output a high value (e.g., a logic "1") prior to detecting a local peak and may output a low value (e.g., a logic "0") after detecting the local peak, or vice vera. Alternatively, peak detector 84 may output a short pulse when a peak is detected. In the example of FIG. 5, peak detector 84 may assert its output (e.g., drive its output high) from time t1 to t2 before detecting peak 102 while the envelope signal is rising and may deassert its output (e.g., drive its output low) from time t2 to t3 after detecting peak 102 while the envelope signal is falling, or vice versa. The time period from t1 to t2 can be referred to and defined as the "rise time" (denoted as trise in FIG. 5) of the detected peak in the envelope signal 100, whereas the time period from t2 to t3 can be referred to and defined as the "fall time" (denoted as tfall in FIG. 5) of the detected peak in the envelope signal 100. This detected peak waveform exceeding threshold value THRES from time t1 to t3 is sometimes referred to as a detected pulse.

The asymmetry of the detected peak in envelope waveform 100 can be quantified by comparing the rise time with the fall time. The rise time of the peak waveform can be measured using rising edge measurement circuit 86, whereas the fall time of the peak waveform can be measured using falling edge measurement circuit 88. Rising edge measurement circuit 86 may be a first counter having a start input configured to receive the output signal from threshold detector 82 and having a stop input configured to receive the output signal from peak detector 84. Configured in this way, circuit 86 can be used to measure the time period from the envelope waveform exceeding the threshold until the peak point. Falling edge measurement circuit 88 may be a second counter having a start input configured to receive the output signal from peak detector 84 and having a stop input configured to receive the output signal from threshold detector 82. Configured in this way, circuit 88 can be used to measure the time period from the peak point until the envelope waveform falling below the threshold.

The operation of circuits 86 and 88 is further illustrated in the timing diagram of FIG. 6A. In FIG. 6A, signal THRES_OUT can be driven high whenever envelope waveform 100 exceeds the threshold value; signal RISING_EDGE can be driven high when waveform 100 exceeds the threshold until the peak is detected and is driven low after the peak is detected; signal CNT_RISE represents the output of rising edge measurement circuit (counter) 86; and signal CNT_FALL represents the output of falling edge measurement circuit (counter) 88. The vertical dotted lines illustrate the discrete sampling times when the outputs of circuits 82 and 84 are allowed to toggle.

As shown in FIG. 6A, envelope waveform 100 may exceed the threshold level (indicated by horizontal line 104) at time t1. However, signal THRES_OUT may be asserted slightly later at sampling time t2. When signal RISING_EDGE is high, rising edge measurement circuit 86 can count up from zero until time t3 when the peak point 102 is detected (e.g., CNT_RISE can increment until signal RISING_EDGE is driven low). After time t3, signal CNT_RISE will maintain its current count value such as count C1 in the example of FIG. 6A. At time t3 (e.g., when THRES_OUT is high and RISING_EDGE is low), falling edge measurement circuit 88 can count up from zero until time t5 when waveform 100 falls below the threshold level (e.g., CNT_FALL can increment until signal THRES_OUT is driven low). After time t5, signal CNT_FALL will maintain its current count value such as count C2 in the example of FIG. 6A.

Summing circuit 90 (in FIG. 4) can compare the rise time and the fall time by computing the difference between C1 and C2. Summing circuit 90 may have a first input configured to receive the count value from rising edge measurement circuit 86 and a second input configured to receive the count value from falling edge measurement circuit 88. Summing circuit 90 may therefore sometimes be referred to as a subtraction circuit. Subtractor 90 may output a corresponding difference value to an optional low pass filter 92. Low pass filter 92 can be used to average out difference values computed from multiple peaks, which can help reduce quantization error. For example, low pass filter 92 can be used average measurements from two or more peaks, from 2-5 peaks, from 5-10 peaks, from 10-20 peaks, or more than 20 peaks. The term "peak" can be defined herein as the envelope of the demodulated signal exceeding the threshold level. The averaged difference value can be output as the computed delay error signal ERR. The difference between the rise time and the fall time can grow with the overall duration of the detected peak (pulse) even if the relative amount of asymmetry is the same. Thus, the difference between C1 and C2 can sometimes be normalized to the sum of C1 and C2 or by some function thereof. Delay error measurement circuit 74 can therefore sometimes include a normalization block configured to scale the difference by a duration of the detected peak(s).

In the example of FIG. 6A, it can be seen that waveform 100 actually crosses the threshold line 104 at time t1 (e.g., the rising edge crossing) and t4 (e.g., the falling edge crossing) but such crossings are only captured or sampled by circuits 82, 84, 86, and 88 at time t2 and t5. This time discrepancy can also lead to quantization error. To reduce such quantization error, digital interpolation operations can be performed to increase the sampling resolution for more accurate timing measurements. FIG. 6B is a timing diagram illustrating how an interpolated rising edge threshold crossing point can be obtained. As shown in FIG. 6B, value $Y_L$ can represent a first sampling point at time nT before the crossing point, and value $Y_R$ can represent a second sampling point at subsequent time (n+1)T after the crossing point. The time interval T between two successive sampling times is known. Based on such information, a slope m of interpolation line 105 can be calculated using the following equation:

$$m = (Y_R - Y_L)/T \qquad (1)$$

After computing slope m, an estimated crossing point 108 can be determined using the following equation:

$$m = (THRES - Y_L)/\Delta T \qquad (2)$$

where the threshold level THRES is a known value. The time offset $\Delta T$ from sampling time nT associated with crossing point 108 can then be computed using the following equation:

$$\Delta T = (THRES - Y_L)/m \qquad (3)$$

Computed value $\Delta T$ can then be used to acquire a more accurate timing value for the rising edge crossing. The example of FIG. 6B illustrating interpolation for a rising edge crossing for envelope waveform 100 is illustrative. Such interpolation operations can also be performed to obtain a more accurate timing measurement for a falling edge crossing for waveform 100. Performing interpolation in this way can help reduce quantization error for the rising edge and falling edge timing measurements.

Figure 7:
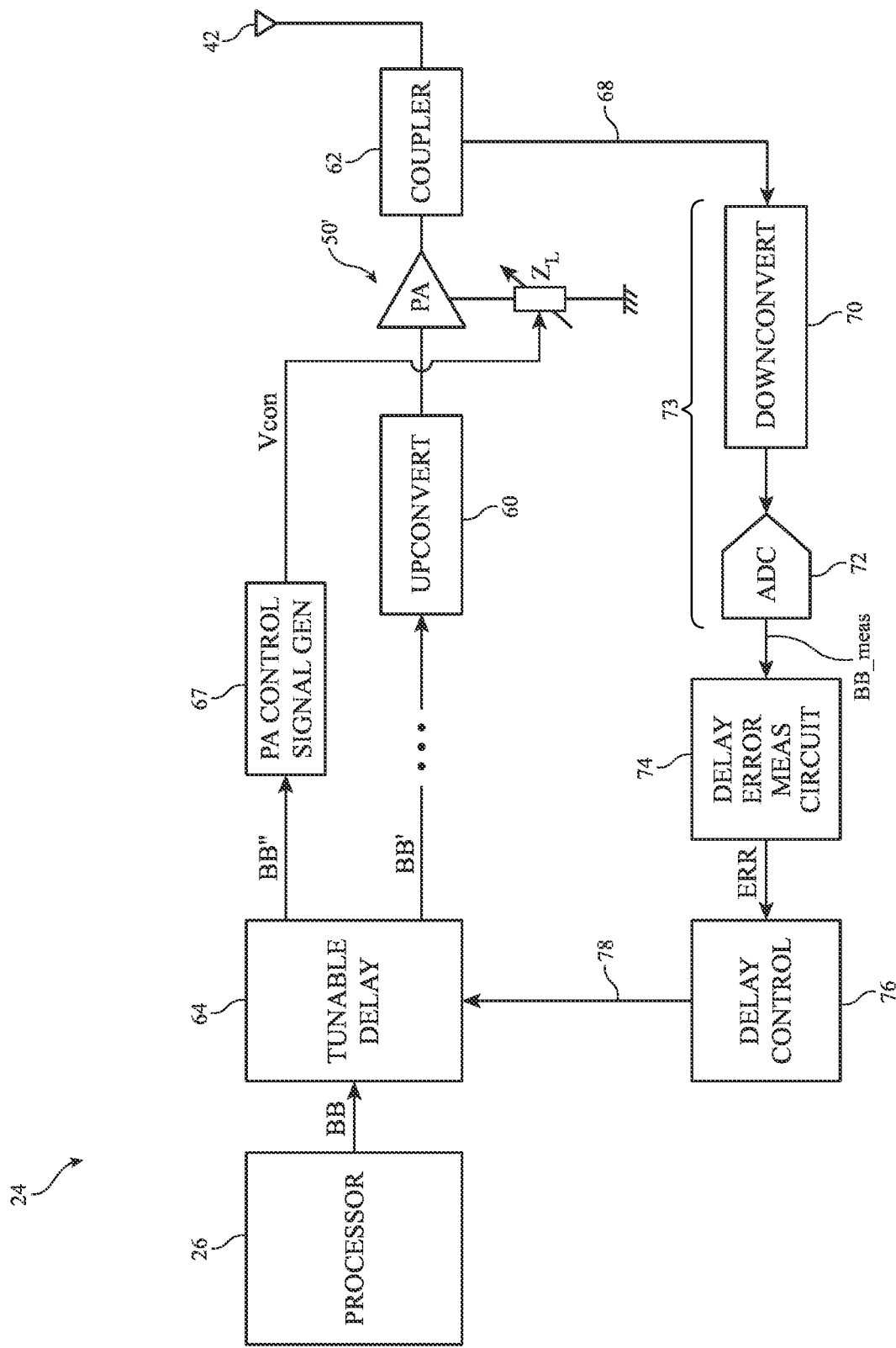
FIG. 7 is a diagram of illustrative transmit circuitry having tunable delay circuitry configured to delay a baseband signal for a load modulated radio-frequency amplifier in accordance with some embodiments.

The embodiment of FIG. 3 showing a closed loop delay control scheme for tuning amplifier power supply voltage Vcc is illustrative. FIG. 7 shows another embodiment in which radio-frequency amplifier 50 is a load modulated amplifier 50'. Instead of the amplifier being tuned via the power supply voltage, load modulated amplifier 50' is tuned via an adjustable load component $Z_L$. Such type of radio-frequency power amplifier can be referred to and defined herein as a load-line modulated radio-frequency amplifier. Adjustable load component $Z_L$ can have a load impedance that is tuned to provide amplifier 50' with different gain profiles.

As shown in FIG. 7, wireless circuitry 24 may include an amplifier control signal generator such as control signal generator 67 configured to receive baseband signal BB" from tunable delay circuit 64 and to output a control signal Vcon for adjusting the amplifier load component $Z_L$. Control signal generator 67 may include an absolute value function generator, a signal shaping function, a linear or non-linear transformation function, a combination of these functions, or other signal conditioning function for outputting amplifier control signal Vcon. If desired, control signal generator 67 may also include a non-linearity estimator (e.g., an amplifier non-linearity estimator that models a non-linear behavior of amplifier 50'), an amplifier load response estimator (e.g., an amplifier load response estimator that implements a baseband model of a frequency-dependent response of a load at the output of amplifier 50'), and/or other circuitry that can help tune component $Z_L$ for optimum performance and efficiency. Control signal Vcon is fed to a control terminal of amplifier 50'. The control terminal of load modulated amplifier 50' that receives Vcon from control signal generator 67 is sometimes referred to as a control input of amplifier 50'.

Tunable delay circuit 64 may be configured to receive signal BB from processor 26 and to output a first baseband signal BB' to upconverter 60 and a second baseband signal BB" to control signal generator 67. In some scenarios, tunable delay circuit 64 can generate signal BB' by delaying signal BB (while signal BB is passed through without delay as signal BB"). In other scenarios, tunable delay circuit 64 can generate signal BB" by delaying signal BB (while signal BB is passed through without delay as signal BB'). In other words, only one of signals BB' and BB" should be delayed by circuit 64 at any given time relative to input baseband signal BB.

For example, in response to detecting a peak signal profile that leans to the left (i.e., a valid pulse having a rise time that is shorter than the fall time), tunable delay circuit 64 can delay the generation of Vcon (e.g., by delaying the generation of baseband signal BB"). On the other hand, in response to detecting a peak signal profile that leans to the right (i.e., a valid pulse having a fall time that is shorter than the rise time), tunable delay circuit 64 can delay the generation of the radio-frequency input signal (e.g., by delaying the generation of baseband signal BB'). The delay control scheme shown in the example of FIG. 7 can be referred to as a "closed loop" delay adaptation. The remaining components within wireless circuitry 24 shown in FIG. 7 (e.g., circuits 60, 62, 73, 74, and 76) have the same structure and function as those already described in detail in connection with FIGS. 3-6 and need not be reiterated in detail to avoid obscuring the present embodiment.

Figure 8:
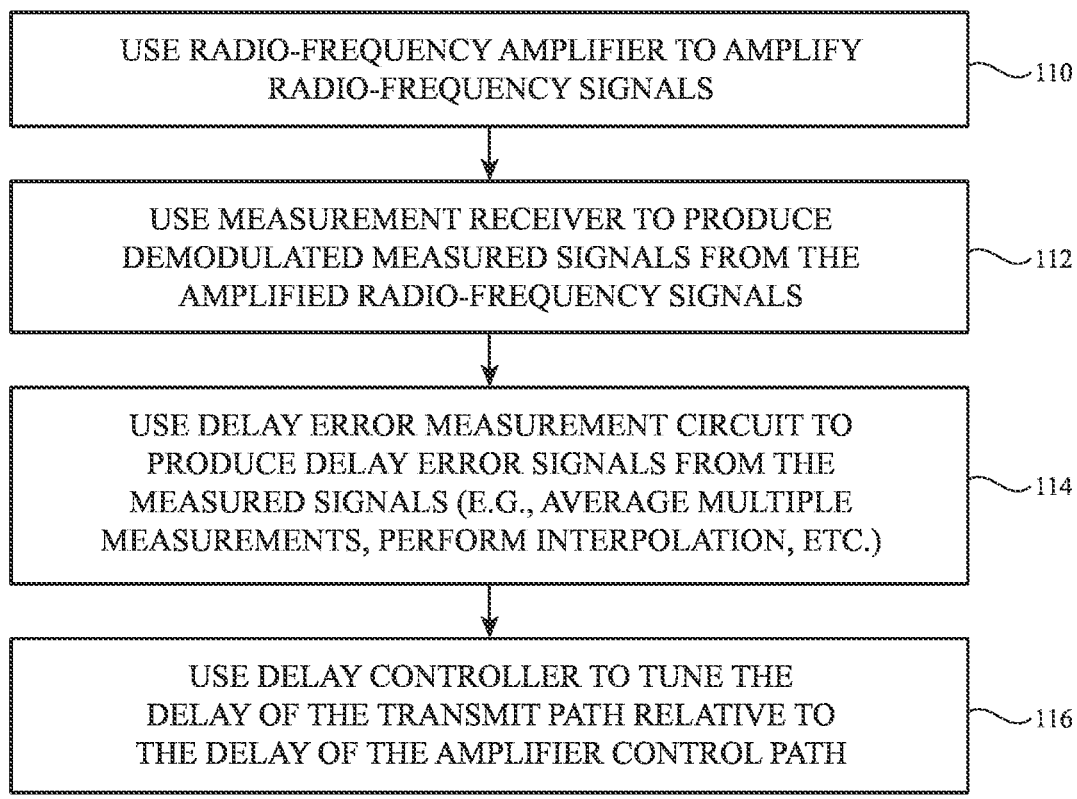
FIG. 8 is a flow chart of illustrative operations for using the tunable delay circuitry of the type shown in FIG. 3 or FIG. 7 in accordance with some embodiments.

FIG. 8 is a flow chart of illustrative operations for using the tunable delay circuitry of the type shown in FIG. 3 or FIG. 7. During the operations of block 110, the radio-frequency amplifier (e.g., amplifier 50 of FIG. 3 or the load modulated amplifier 50' of FIG. 7) can be used to amplify a radio-frequency input signal to output a corresponding amplified radio-frequency signal. During the operations of block 112, the measurement receiver (e.g., feedback receiver 73 of FIG. 3 or FIG. 7) may receive a portion of the amplified radio-frequency signal from radio-frequency coupler 62 and produce a corresponding demodulated signal (e.g., signal BB_meas).

During the operations of block 114, delay error measurement circuit 74 may receive the demodulated signal from the measurement receiver and output a corresponding error signal. Delay error measurement circuit 74 can be used to detect one or more peaks in an envelope of the demodulated signal. Delay error measurement circuit 74 can determine whether the detected peaks are symmetrical or asymmetrical. The value and/or polarity of the error signal can depend on the amount and type of asymmetry in the detected peaks.

For example, the error signal can be equal to a first set of values when the peaks are skewed to the left (i.e., when the rise time is shorter than the fall time) and can be equal to a second set of values different than the first set of values when the peaks are skewed to the right (i.e., when the rise time is longer than the fall time). If desired, averaging timing information from multiple peaks and/or interpolation techniques can be used to reduce the quantization error associated with measuring the rise and fall times of each detected peak signal exceeding the threshold level. Delay error measurement circuit 74 can include circuit components shown in the example of FIG. 4, can operate in accordance with the timing diagrams of FIGS. 5-6, or can be implemented in other ways to measure an amount of asymmetrical in one or more peaks of the envelope waveform.

During the operations of block 116, delay controller 76 can receive the error signal from delay error measurement circuit 74 and output a delay control signal for tuning delay circuit 64. Delay circuit 64 can tune the delay of the transmit signal path (i.e., the path of the radio-frequency input signal) relative to the delay of the amplifier control path (e.g., the path of variable power supply voltage Vcc or the path of the load control signal Vcon). For example, when detecting a peak having a shorter rise time, delay circuit 64 can delay the control path relative to the input path (e.g., the tunable delay circuit may delay the generation of signal BB" without delaying the generation of BB'). Conversely, when detecting a peak having a shorter fall time, delay circuit 64 can delay the radio-frequency input path relative to the control path (e.g., the tunable delay circuit may delay the generation of signal BB' without delaying the generation of BB"). Operating a closed loop delay adaptation scheme in this way can help ensure proper gain levels and minimal signal distortion even when PVT (process, voltage, and temperature) variations are present and in high bandwidth operations.

The methods and operations described above in connection with FIGS. 1-8 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 and/or wireless communications circuitry 24 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry in wireless circuitry 24, processing circuitry 18 of FIG. 1, etc.). The processing circuitry may include microprocessors, application processors, digital signal processors, central processing units (CPUs), application-specific integrated circuits with processing circuitry, or other processing circuitry.

The foregoing is exemplary and various modifications can be made to the described embodiments. The foregoing embodiments may be implemented individually or in any combination.

What is claimed is:

1. Wireless circuitry comprising:
a radio-frequency amplifier having a first input configured to receive a radio-frequency signal, a second input, and an output;
a tunable delay circuit configured to receive a baseband signal and configured to selectively delay the baseband signal when generating the radio-frequency signal for the first input of the radio-frequency amplifier or to selectively delay the baseband signal when generating a signal for the second input of the radio-frequency amplifier;
a feedback receiver coupled to the output of the radio-frequency amplifier and configured to generate a corresponding baseband signal; and
a delay error measurement circuit configured to output an error signal that is used to control the tunable delay circuit based on only the baseband signal generated by the feedback receiver.

2. The wireless circuitry of claim 1, wherein the second input of the radio-frequency amplifier comprises a power supply terminal, further comprising:
envelope tracking circuitry configured to output a variable power supply voltage to the power supply terminal of the radio-frequency amplifier.

3. Wireless circuitry comprising:
a radio-frequency amplifier having a first input configured to receive a radio-frequency signal, a second input, and an output;
a control signal generator configured to output a signal for the second input of the radio-frequency amplifier, the signal being used to tune an adjustable load component in the radio-frequency amplifier;
a tunable delay circuit configured to receive a baseband signal and configured to selectively delay the baseband signal when generating the radio-frequency signal for the first input of the radio-frequency amplifier or to selectively delay the baseband signal when generating the signal for the second input of the radio-frequency amplifier;
a feedback receiver coupled to the output of the radio-frequency amplifier and configured to generate a corresponding baseband signal; and
a delay error measurement circuit configured to receive the corresponding baseband signal generated by the feedback receiver and to output an error signal that is used to control the tunable delay circuit.

4. The wireless circuitry of claim 1, wherein the delay error measurement circuit is further configured to detect one or more peaks in an envelope of the baseband signal and to output the error signal by computing an amount of asymmetry in the one or more detected peaks.

5. The wireless circuitry of claim 4, wherein the delay error measurement circuit is further configured to detect the one or more peaks by detecting when the envelope of the baseband signal rises above a threshold level.

6. The wireless circuitry of claim 5, wherein the delay error measurement circuit is further configured to output the error signal by averaging measurements from a plurality of detected peaks.

7. The wireless circuitry of claim 4, wherein the delay error measurement circuit is further configured to compute rise and fall times in the one or more detect peaks using interpolation.

8. The wireless circuitry of claim 1, further comprising:
a delay controller configured to receive the error signal and to output a delay control signal for adjusting the tunable delay circuit.

9. The wireless circuitry of claim 1, wherein the feedback receiver comprises:
a downconversion circuit coupled to the output of the radio-frequency amplifier; and
an analog-to-digital converter configured to receive a signal from the downconversion circuit and to output the baseband signal.

10. The wireless circuitry of claim 1, wherein the delay error measurement circuit comprises:
a threshold detector configured to detect when an envelope of the baseband signal exceeds a threshold level; and
a peak detector configured to detect a peak point in the envelope of the baseband signal.

11. The wireless circuitry of claim 10, wherein the delay error measurement circuit further comprises:
a rising edge measurement circuit configured to output a first value proportional to a rise time of a rising edge in the envelope of the baseband signal, the rise time extending from when the envelope exceeds the threshold level until the peak point; and
a falling edge measurement circuit configured to output a second value proportional to a fall time of a falling edge in the envelope of the baseband signal, the fall time extending form when the envelope reaches the peak point until falling below the threshold level.

12. The wireless circuitry of claim 11, wherein the rising edge measurement circuit comprises a first counter circuit, and wherein the falling edge measurement circuit comprises a second counter circuit.

13. The wireless circuitry of claim 11, wherein the delay error measurement circuit further comprises a subtractor configured to compute a difference between the first and second values.

14. The wireless circuitry of claim 13, wherein the delay error measurement circuit further comprises a normalization block configured to scale the difference by a duration of the one or more detected peaks.

15. The wireless circuitry of claim 13, wherein the delay error measurement circuit further comprises a low pass filter configured to average the difference.

16. The wireless circuitry of claim 11, wherein:
the rising edge measurement circuit is configured to output the first value by performing a first interpolation operation; and
the falling edge measurement circuit is configured to output the second value by performing a second interpolation operation.

17. A method of operating wireless circuitry, comprising:
using a radio-frequency amplifier to amplify a radio-frequency signal;
using a feedback receiver to receive a portion of the amplified radio-frequency signal and to output a demodulated signal;

detecting one or more peaks in an envelope of the demodulated signal;

computing an amount of asymmetry in the one or more detected peaks; and selectively delaying an input signal to the radio-frequency amplifier based on the computed amount of asymmetry.

18. The method of claim 17, wherein selectively delaying an input signal to the radio-frequency amplifier based on the computed amount of asymmetry comprises:

in response to determining that the one or more detected peaks are skewed in a first direction, delaying the radio-frequency signal; and in response to determining that the one or more detected peaks are skewed in a second direction different than the first direction, delaying a power supply voltage or a load impedance control signal for the radio-frequency amplifier.

19. The method of claim 17, further comprising:

averaging timing measurements obtained from multiple detected peaks; and performing interpolation to detect when the one or more peaks in the envelope crosses a threshold value.

20. Circuitry comprising:

a radio-frequency amplifier;

a tunable delay circuit coupled to one or more inputs of the radio-frequency amplifier;

a measurement receiver coupled to an output of the radio-frequency amplifier and configured to generate a demodulated signal; and a symmetry detection circuit coupled to the radio-frequency amplifier and configured to receive the demodulated signal, detect a peak in an envelope of the demodulated signal crossing a threshold level, compute an amount of asymmetry in the detected peak, and output a control signal to the tunable delay circuit.

* * * * *